United States Patent [19]

Pesic

[11] Patent Number: 4,816,235

[45] Date of Patent: * Mar. 28, 1989

[54] SILVER AND MANGANESE RECOVERY USING ACIDIFIED THIOUREA

[76] Inventor: Batric Pesic, 1913 Conestoga, Moscow, Id. 83843

[*] Notice: The portion of the term of this patent subsequent to Oct. 18, 2005 has been disclaimed.

[21] Appl. No.: 17,909

[22] Filed: Feb. 24, 1987

[51] Int. Cl.[4] .......................... C01G 5/00; C01G 45/00
[52] U.S. Cl. ......................................... 423/32; 423/34; 423/42; 423/49; 423/50; 423/DIG. 4; 75/101 R; 75/108; 75/118 R; 75/121
[58] Field of Search .................. 423/49, 50, 27, 32, 423/34, 42, DIG. 4; 75/101 R, 118 R, 408, 121

[56] References Cited

U.S. PATENT DOCUMENTS

| | | | |
|---|---|---|---|
| 2,663,618 | 12/1953 | Babbitt et al. | 423/DIG. 4 |
| 4,145,212 | 3/1979 | Bodson | 75/118 R |
| 4,342,591 | 8/1982 | Lesoille | 75/101 R |
| 4,369,061 | 1/1983 | Kerley | 75/103 |
| 4,545,816 | 10/1985 | Rappas | 423/49 |
| 4,561,947 | 12/1985 | Schulze | 204/109 |
| 4,606,766 | 8/1986 | Genik | 75/118 R |
| 4,645,535 | 2/1987 | Little | 423/32 |

OTHER PUBLICATIONS

Chen, C. K. et al., Hydrometallurgy, 5 (1980) 207–2112, "A Study of the Leaching of Gold and Silver by Acidothioreation" (1980).

Schulze, R. G., SKW Trostberg Akbengesellschaft publication presented at the International Precious Metals Symposium in Los Angeles, Feb. 27–29, 1984.

Primary Examiner—Robert L. Stoll
Attorney, Agent, or Firm—Marvin S. Towsend

[57] ABSTRACT

A method for obtaining silver and manganese metal from a silver-manganese ore includes the step of leaching the ore with acidified thiourea. More specifically, the method includes the step of leaching the ore with an acidic thiourea solution to form a leach liquor containing compounds of silver and manganese and an insoluble ore residue. The leach liquor is contacted with a quantity of activated carbon to adsorb the silver thiourea complexes on the carbon and to form an extract solution containing the manganese compounds. Next, the carbon which contains adsorbed silver thiourea complexes is contacted with an eluant to desorb the silver complexes from the carbon. The silver metal is recovered from the silver complexes obtained from desorbing the carbon. The manganese metal is recovered from the extract solution. The ore subjected to acidic thiourea leaching is selected from the group consisting of in situ ore, mined ore, comminuted ore, and ore concentrate. Conventional leaching techniques can be employed such as heap or dump leaching and agitation leaching.

33 Claims, 9 Drawing Sheets

The effect of thiourea concentration on dissolution of silver from Ag-Mn ores

The effect of thiourea concentration on dissolution of manganese from Ag-Mn ores The effect of sulfuric acid concentration on dissolution of silver from Ag-Mn ores The effect of sulfuric acid concentration on dissolution of manganese from Ag-Mn ores The effect of initial particle size on dissolution of silver from Ag-Mn ores The effect of initial particle size on dissolution of manganese from Ag-Mn ores Dissolution of silver from Ag-Mn ores as a function of temperature Dissolution of manganese from Ag-Mn ores as a function of temperature

SILVER AND MANGANESE RECOVERY USING ACIDIFIED THIOUREA

FIELD OF THE INVENTION

The present invention relates to the field of recovery of valuable metals from ores, and more particularly to the recovery of manganese and silver.

BACKGROUND OF THE INVENTION

Manganese is about twelfth in the list of the most abundant elements in the earth's crust, and there are more than 150 known minerals which contain manganese as an important constituent. An ore which contains at least 35% manganese is classified as a manganese ore. An ore which contains from 10–35% manganese is referred to as a ferroginous manganese ore. An ore which contains from 5–10% manganese is known as a manganiferrous ore.

An important class of manganiferrous ores are manganiferrous-silver ores which contain both manganese and silver. Manganiferrous-silver ores occure in the oxidized portions of the silver deposits of the western United States. In some such ores, silver is associated with manganese oxides which are dispersed through calcite causing the host rock to be colored black and known as black calcite. Black calcites can occur in carbonate rocks (having 10–1500 ounces of silver per ton) and in volcanic rocks (having less than 1 ounce of silver per ton).

Silver mineralization associated with manganese oxides and black calcites can occur in veins or as diseminations. In the United States, silver-bearing manganese veins are located in a broad arc that extends from southern Colorado to southwest New Mexico, southern Arizona, and southeast California. Areas of disseminated silver-manganese mineralization include the Creede and Silver Cliff districts of Colorado and the Tombstone and Hardshell districts of Arizona. These deposits are also characterized in having significant amounts of silver halides: cerargyrite (AgCl), bromargyrite (AgBr), and iodargyrite (AgI). Black calcites are also very common in these deposits.

Oxidized silver ores containing the higher oxides of manganese are generally refractory to hydrometallurgical methods of treatment. Ores with a high proportion of siver and lead have been smelted in the past to obtain these metals. Ores with a low percentage of silver but with a high percentage of manganese and iron oxides have been used for making spiegeleisen and ferromanganese. When ores have contained lower silver, lead, manganese, and iron content, they have been smelted whereby manganese and iron passed into the slag and silver and lead were recovered. In the past, when these ores could not be smelted, they were generally treated by cyanidation with resultant low efficiency in the recovery of the metals.

The United States Bureau of Mines studied the problem of treating silver-manganese ores in the early 1920's, and it was found that the refractory silver in the original ore was insoluble in all the common solvents for metallic silver and its salts. (Clevenger, G. H. and Caron, M. H., "Treatment of Manganese-Silver Ores", U.S. Bureau of Mines Bulletin, B226, 1925). Solvents in which the silver in the original ore was insoluble include: cyanide solutions of all concentrations, dilute and concentrated nitric acid, dilute sulfuric acid, salt solution, alkaline thiosulfates, ammonia, mercury, and other reagents. The conclusion was that in order to obtain the highest recovery of silver, all of the manganese had to be dissolved, or the higher oxides of manganese had to be reduced to manganous oxide (known as the Caron Process when reduction is done pyrometallurgically).

Wet chemical methods to reduce higher manganese oxides were also studied in the Bureau of Mines study. These wet methods included: wet sulfidizing with preliminary treatment of silver manganese ore with hydrogen sulfide; treatment with sulfurous acid using an aqueous solution of sulfur dioxide; treatment with metallic iron; and treatment with pyrite. The reduced ores were subsequently treated with cyanide to recover silver.

Clevenger and Caron (1925) did not have enough information on the mineralogy of silver-manganese ores, and their attempt to determine the form of silver in the silver-manganese ores that were examined was unsuccessful.

Other methods have been disclosed in the prior art for extracting silver from silver-manganese ores. Such methods include: a chloridizing roast; extraction with thiosulfate solution; treatment with sulfur dioxide; a two step extraction process wherein the second step involves an extraction with cyanide; direct cyanidation; malonitrile leach; and leaching with ammonium hydroxide-sodium thiosulfate under slight oxygen pressure.

The various prior art methods of extracting silver and manganese from silver-manganese ores have one or more of the following problems: they are inefficient without recovering a satisfactory amount of silver and/or manganese; they are too expensive to operate, e.g. they require neutralization in shifting from an acidic to basic environment and/or they require two or more ore extraction steps; they require the use of toxic materials, e.g. cyanide.

In the United States, there are vast reserves of silver-manganese ores, but there is no efficient method disclosed in the prior art for extraction of the valuable metals from those ores.

SUMMARY OF THE INVENTION

Accordingly, it is a primary object of the present invention to provide an efficient method for extracting valuable metals from silver-manganese ores.

Another object of the invention is to provide an efficient method for extracting valuable metals from silver-manganese ores which does not employ toxic materials such as cyanide.

Another object is to provide a method of silver-manganese ore leaching method which uses one leaching step for extracting both the silver and the manganese from the ore.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved method is provided for dissolving silver and manganese from a comminuted ore employing a single leaching step involving leaching the ore with acidified thiourea. In the leaching step, the thiourea reduces and dissolves the manganese and complexes the silver during dissolution of the manganese.

After both the silver and the manganese have been leached from the ore by the acidified thiourea, the leach liquor is passed through a column of activated carbon which absorbs the silver thiourea complexes and passes the dissolved manganese in the liquid extract. Silver metal can be recovered from the silver compounds adsorbed onto the carbon absorbent; and manganese metal can be recovered from dissolved manganese compounds in the liquid extract. Conventional methods such as cementation (on iron, aluminum, or zinc) and electrowinning can be used to recover silver. Conventional methods such as chemical precipitation and electrowinning can be used for recovering the manganese.

The method of the invention can be used to recover manganese alone or in the presence of silver. Furthermore, the method can be used to recover silver in the presence of manganese.

It has been discovered that thiourea is an excellent reductant for higher manganese oxides (e. g. manganese dioxide) which are insoluble in aqueous solution to render them soluble. The insoluble oxides of manganese, after being reduced by the thiourea, are soluble in aqueous solution. The reaction between the higher oxides of manganese and thiourea is stoichiometric.

The ore that is extracted by the acidified thiourea in accordance with the invention may be in situ ore in the ground or in a mine, may be mined ore, may be comminuted ore, or may be an ore concentrate; and the type of leaching that is employed may be conventional leaching techniques such as heap or dump leaching or agitation leaching.

In accordance with yet another aspect of the invention, the acidified thiourea leaching of the ore can be conducted in situ as follows. First, a hole is drilled deep into the ore deposit. Then an acidified thiourea solution is pumped into the hole. The silver and manganese are leached into the acidified thiourea leachant in the form of silver and manganese compounds. The leach solution containing the silver and manganese compounds is pumped out of the hole and contacted with a quantity of carbon to adsorb the silver compounds on the carbon and to form an extract solution containing manganese compounds. Recovery of silver and manganese then proceeds as described above.

In accordane with still another aspect of the invention, the acidified thiourea leaching of the ore can be conducted on an ore concentrate. The ore concentrate containing silver and manganese can be obtained by conventional methods such as flotation, magnetic separation, and heavy media separation, among other methods. The leaching step and the steps for silver and manganese recovery steps are generally as described above.

In accordance with another aspect of the invention, the acidified thiourea leaching of manganese bearing ore can be augmented with the use of other reducing agents that react with the higher oxides of manganese. With the invention, the acidified thiourea serves to reduce higher oxides of manganese, and is thereby consumed during the reduction process. The reaction between the acidified thiourea and the higher manganese oxides is stoichiometric. Dissolution of the manganese is necessary even when it is desired to recover silver from an ore also containing manganese because the silver may be locked in the matrix of the ore. However, if too much thiourea is consumed in the dissolution of the higher manganese oxides, it is possible that not enough thiourea may be left over to complex with silver that is present; and it is important, in the presence of silver, to have sufficient thiourea to complex with the silver.

To lessen the consumption of thiourea which may be more expensive than other reducing agents that can reduce higher oxides of manganese, an additional reducing agent that is cheaper than thiourea can be used either before the use of thiourea or in conjunction with the thiourea. For example, an in situ ore deposit, a mined ore, comminuted ore, or ore concentrate can first be subjected to a reducing step using an augmenting reducing agent selected from the group consisting of sulfur dioxide, coal, and sugars, among others reductants for higher manganese oxides. After the preliminary reduction, the ore is then subjected to leaching with the acidified thioruea. Alternatively, the augmenting reducing agent and the acidified thiourea can be used simultaneously to leach the ore. Then, after leaching, the leach liquor is treated as described above to recover manganese, and silver if also present.

The exact parameters employed in using an augmented reduction of higher manganese oxides prior to or simultaneously with an acidified thiourea leach of an ore depend upon a number of factors specific to the actual application contemplated. Such factors include the porosity of the ore, the concentration of the higher oxides of manganese, the nature of the specific augmenting reductant employed, and the temperature of the ore and the reductant, among other factors.

In accordance with another aspect of the invention, a method is provided for separating silver thiourea complexes from carbon the which the silver thiourea compounds are adsorbed. The method includes the step of eluting the silver thiourea compounds from the carbon with an aqueous thiosulfate solution. Preferably, the thiosulfate eluant solution is alkaline.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF A PREFERRED EMBODIMENT OF THE INVENTION

Figure 1:
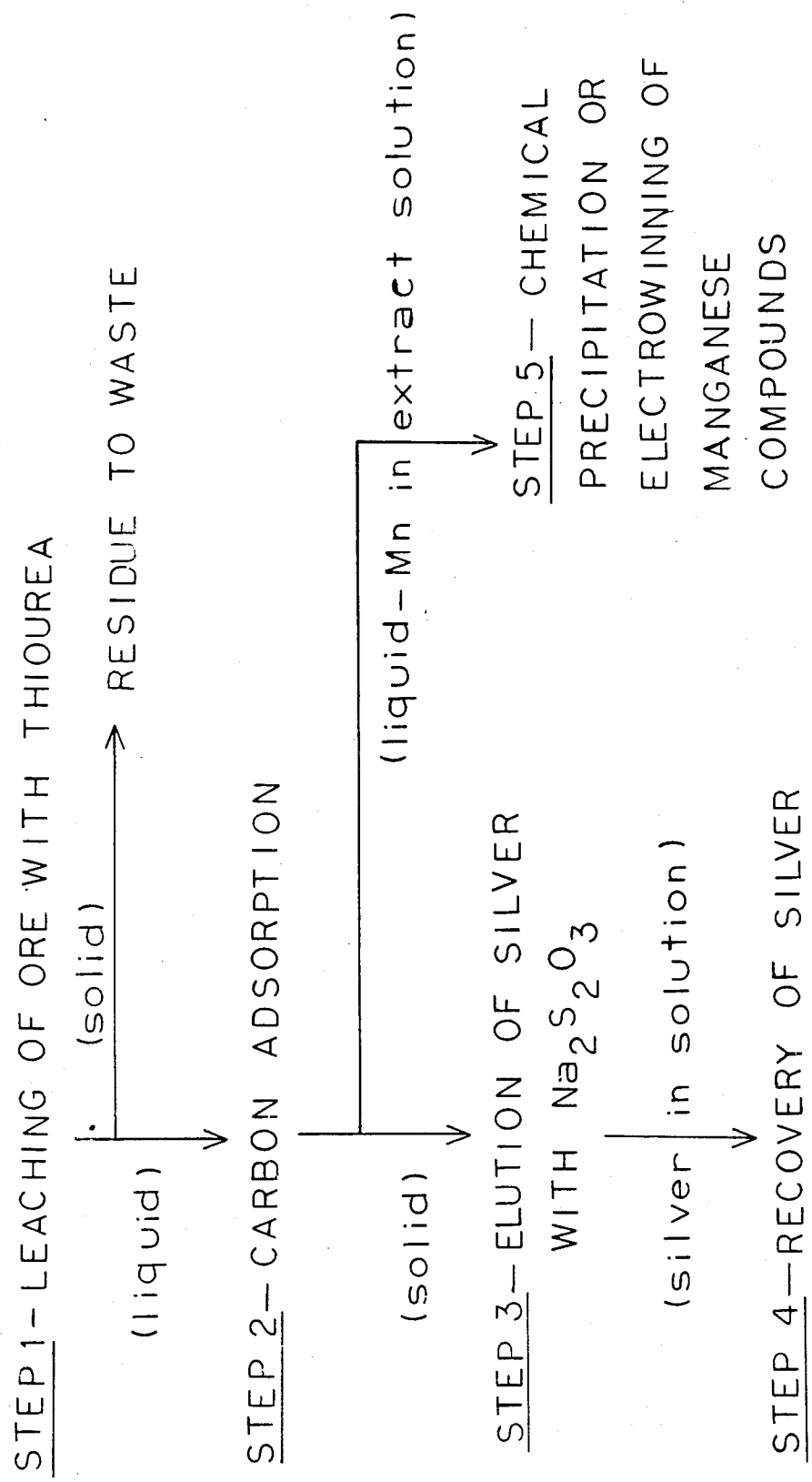
FIG. 1 is a schematic diagram of a method for obtaining silver and manganese metal from a silver-manganese ore.

With reference to FIG. 1, a schematic diagram of a method for obtaining silver and manganese metal from a silver-manganese ore is shown. The ore is understood to be selected from the group consisting of in situ ore, mined ore, comminuted ore, and ore concentrate. The method comprises the steps of: (1) leaching the ore with an acidic thiourea solution to form a leach liquor containing compounds of silver and manganese and an insoluble ore residue; (2) contacting the leach liquor from step 1 with a quantity of activated carbon to adsorb the silver thiourea complexes on the carbon and to form an extract solution containing the manganese compounds; (3) treating the carbon which contains adsorbed silver thiourea complexes from step 2 with an eluant such as an alkaline solution of sodium thiosulfate (e. g. 0.3 M) to desorb the silver complexes from the carbon; (4) recovering silver metal from the silver complexes obtained from step 3 by conventional methods; and (5) recovering manganese from the extract solution from step 2 by conventional methods.

The ore from the Round Mountain District, Colorado, was subjected to acidified thiourea leachings in accordance with the invention. The ore was crushed, ground and dry sieved into fractions in the range of passing No. 16 mesh and being retained on No. 400 mesh. Each size fraction was subsequently wet sieved to remove the fines, dried under a lamp, and stored for future use. Each size fraction of ore was analyzed for silver and manganese. The ore composition was approximately 3.0 ounces of silver per ton and approximately 3% manganese depending slightly on the size of the fraction.

The leaching experiments employed the technique of agitation leaching and were all performed in the same apparatus, and any conventional leaching apparatus would also be satisfactory. When the leaching solution, which was 750 milliliters of acidified thiourea solution, attained the desired temperature, 25 grams of ore was introduced into the reactor to start the leaching reaction. During dissolution, sample solutions of 10 milliliters were taken out for analysis of the silver and manganese. After the leaching steps were complete, the leaching residues were also analyzed for silver and manganese. Atomic absorption was used to analyze the solution samples, and fire assaying was used to analyze the leaching residues (for silver).

A set of standard experimental conditions for dissolution studies of silver and manganese from an ore from Round Mountain District, Colorado included:

Temperature: 25 deg. C
Thiourea Concentration: 0.05M
Sulfuric Acid Concentration: 0.1M
Particle Size: −60 to +80 mesh
Volume: 750 cm$^3$
Ore Sample: 25 grams The results of the tests that were conducted are presented graphically in FIGS. 2–9. For the tests that were conducted, a highly effective concentration of thiourea for both silver and manganese extraction was 0.1M thiourea (see FIGS. 2 and 3).

More generally, the concentration of thiourea for extracting both silver and manganese is effective in the range of 0.0001 to 1.0 molar.

Figure 4:
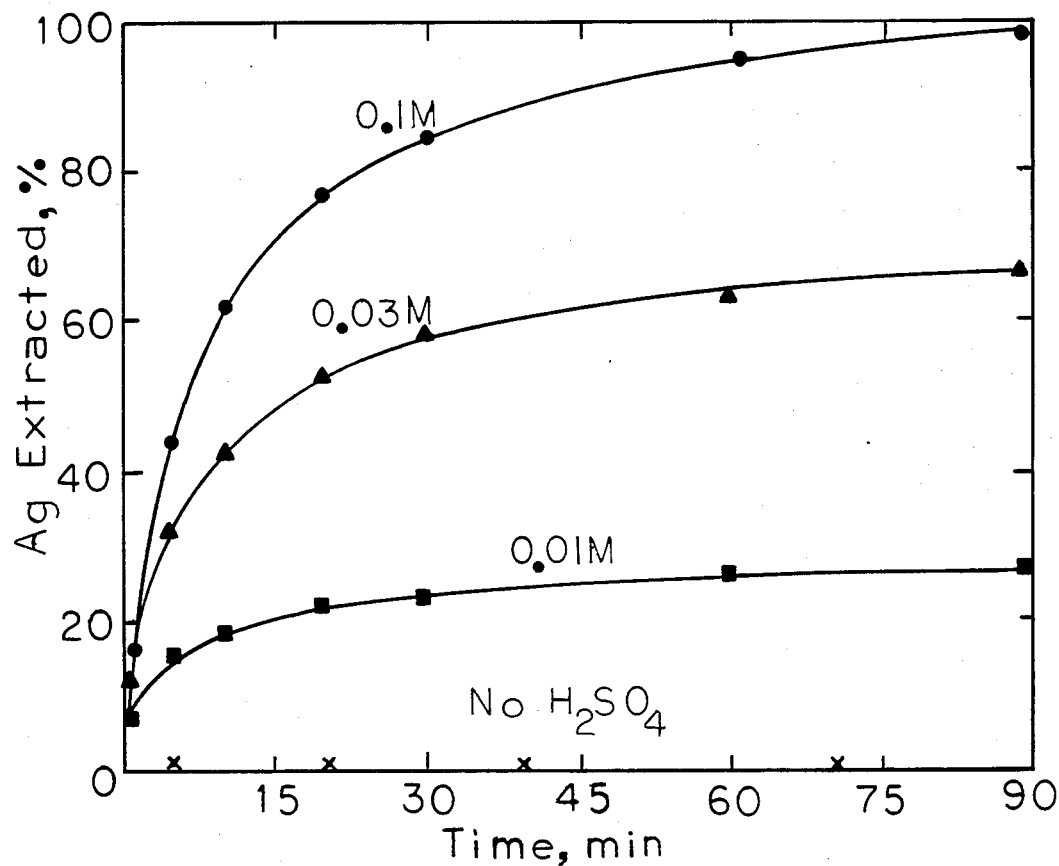
FIG. 4 is a graph depicting the effect of sulfuric acid concentration on the dissolution of silver from a comminuted silver-manganese ore using acidified thiourea.
Figure 5:
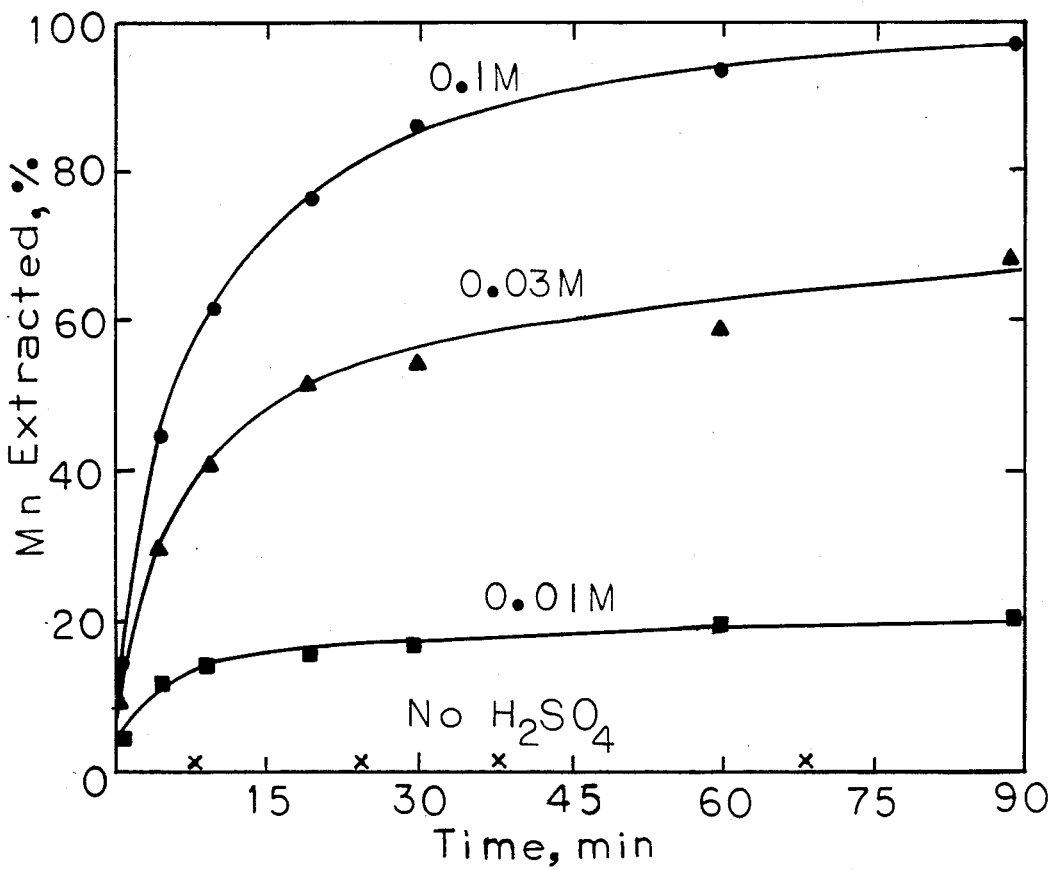
FIG. 5 is a graph depicting the effect of sulfuric acid concentration on the dissolution of manganese from a comminuted silver-manganese ore using acidified thiourea.

With respect to the concentration of the sulfuric acid, a highly effective concentration was 0.1M sulfuric acid (see FIGS. 4 and 5). It is noted that 0.1M sulfuric acid corresponds to a hydrogen ion concentration of 0.2 molar since each molecule of sulfuric acid contains two hydrogen ions.

More generally, the concentration of hydrogen ions for extracting both silver and manganese is effective in the range of 0.0001 to 0.5 molar. This range of hydrogen ion concentration correlates to a sulfuric acid concentration in the range of 0.00005 to 0.25 molar. However, the sulfuric acid concentration is also effective at 0.5 molar.

It is observed from FIGS. 2–5 that the extraction of silver and manganese generally increase with increasing concentration of thiourea and sulfuric acid.

Figure 6:
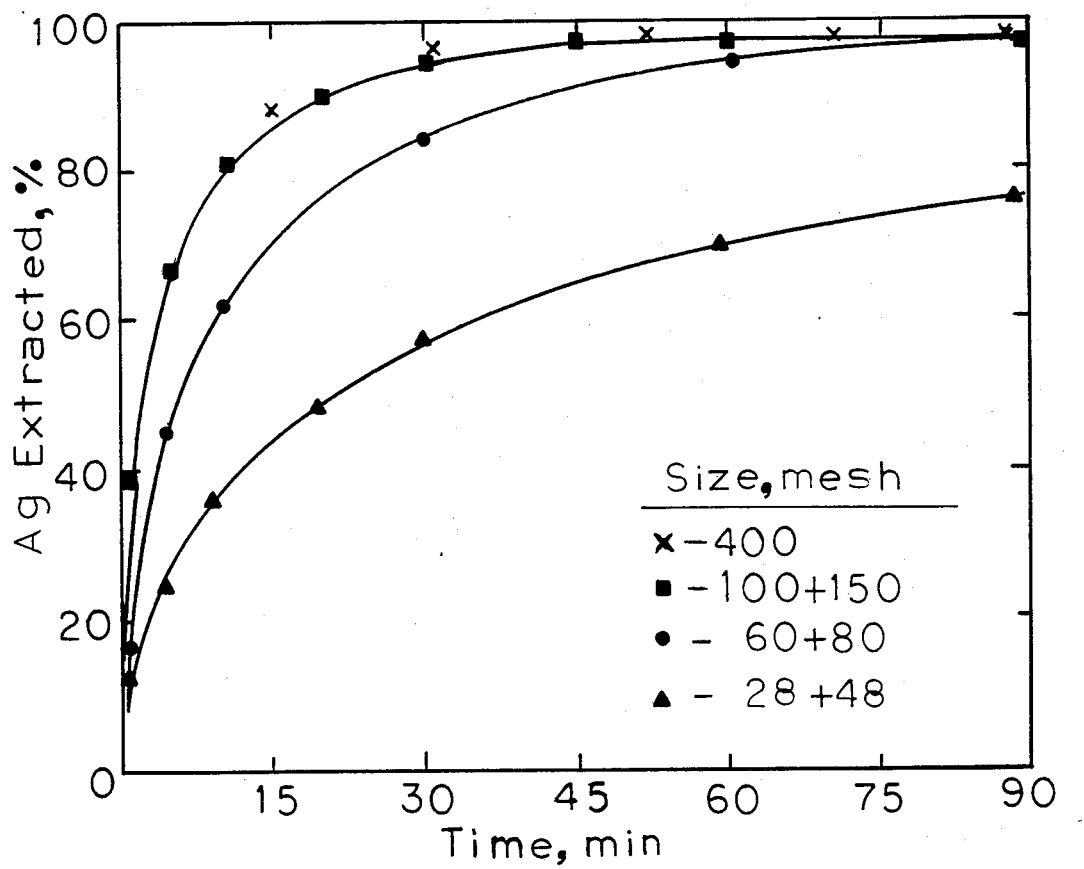
FIG. 6 is a graph depicting the effect of particle size of the ore on the dissolution of silver from a comminuted silver-manganese ore using acidified thiourea.
Figure 7:
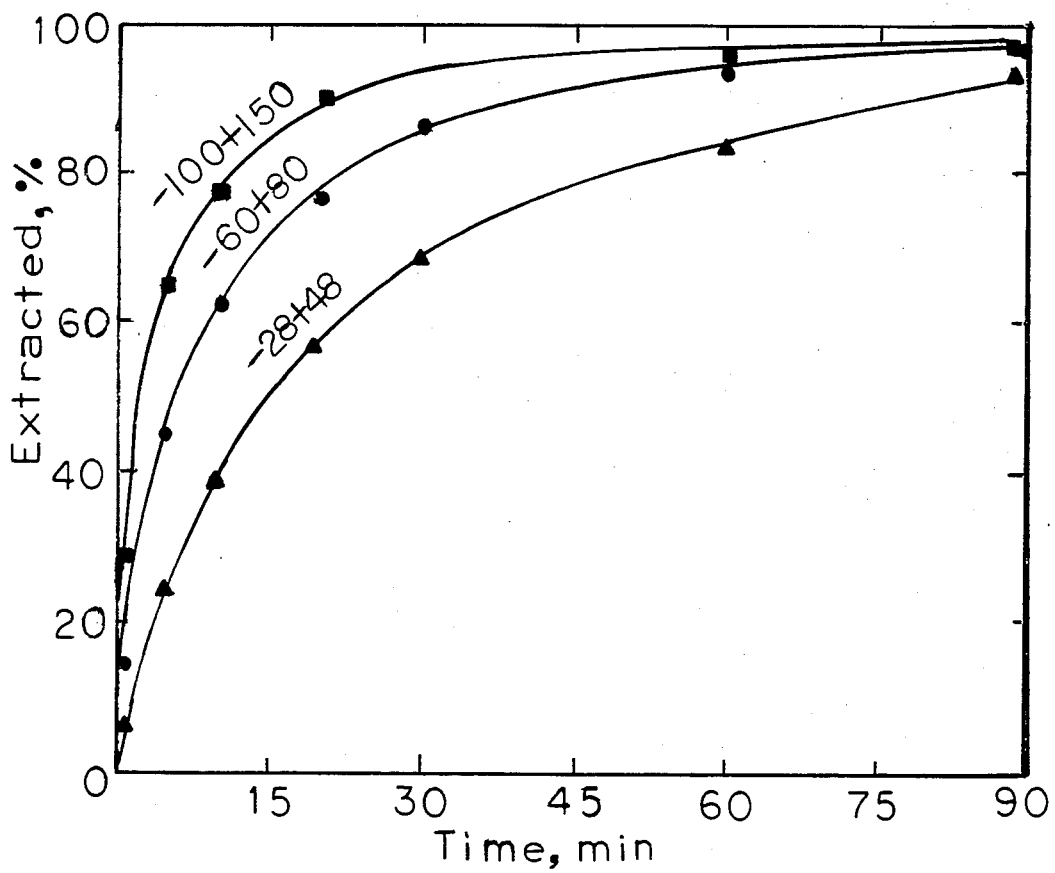
FIG. 7 is a graph depicting the effect of particle size of the ore on the dissolution of manganese from a comminuted silver-manganese ore using acidified thiourea.

Preferred particle sizes for the comminuted ore samples tested were particles in the range from those that passed through a No. 60 sieve to those particles that were retained on a No. 150 sieve (See FIGS. 6 and 7).

Preferred temperatures for leaching of the samples tested are in the range of 25–45 deg. C (See FIGS. 8 and 9).

Figure 2:
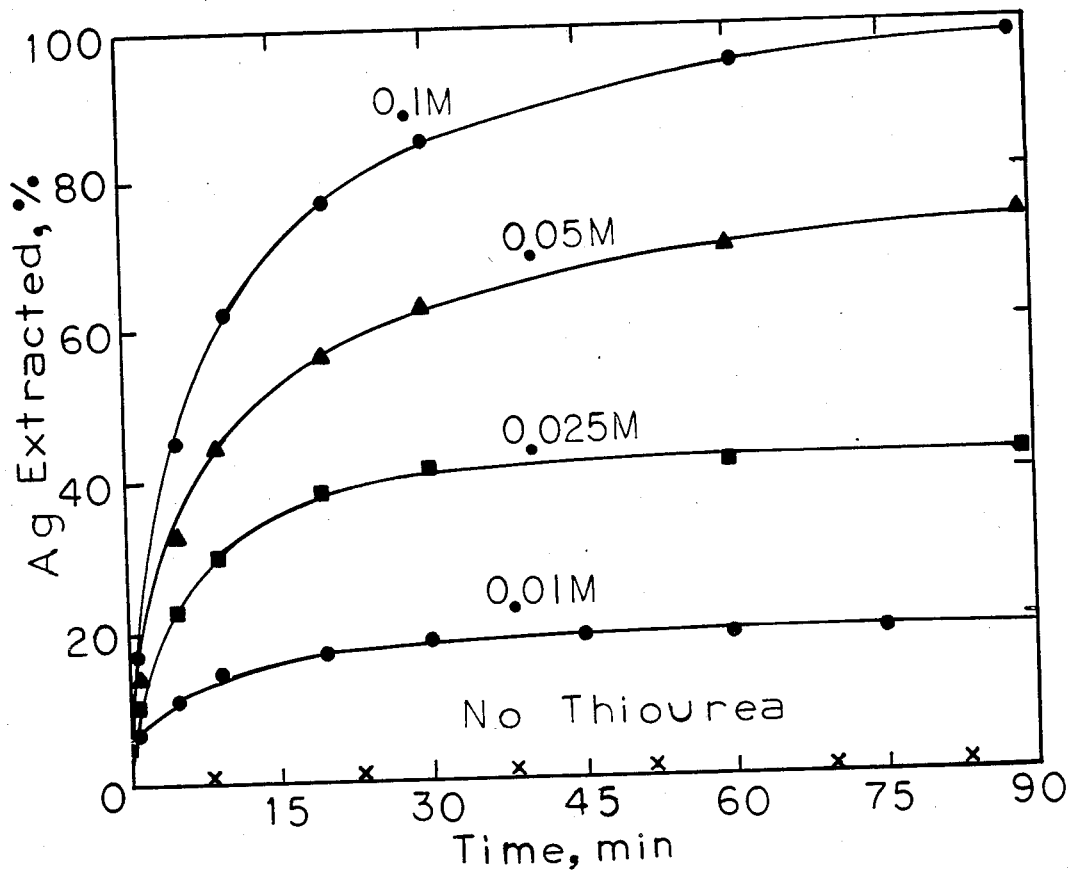
FIG. 2 is a graph depicting the effect of acidified thiourea concentration on the dissolution of silver from a comminuted silver-manganese ore.

More specifically, FIG. 2 is a graph depicting the effect of acidified thiourea concentration on the dissolution of silver from a comminuted silver-manganese ore. The graph shows that more than 90% of the silver was extracted from the ore in 90 minutes using a 0.1M thiourea solution.

Figure 3:
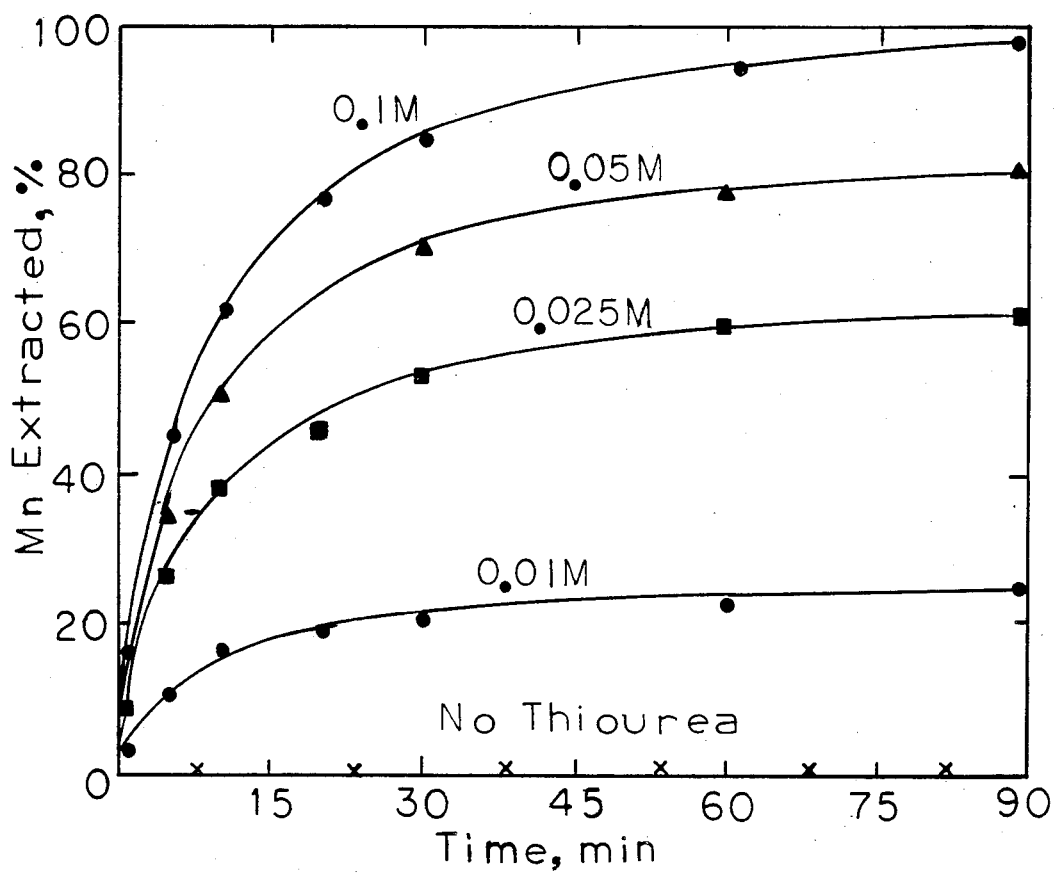
FIG. 3 is a graph depicting the effect of acidified thiourea concentration on the dissolution of manganese from a comminuted silver-manganese ore.

FIG. 3 is a graph depicting the effect of acidified thiourea concentration on the dissolution of manganese from a comminuted silver-manganese ore. The graph shows that more than 90% of the manganese was extracted from the ore in 90 minutes using a 0.1M thiourea solution.

FIG. 4 is a graph depicting the effect of sulfuric acid concentration on the dissolution of silver from a comminuted silver-manganese ore using acidified thiourea. The graph shows that more than 90% of the silver was extracted from the ore in 90 minutes using a 0.1M sulfuric acid solution.

FIG. 5 is a graph depicting the effect of sulfuric acid concentration on the dissolution of manganese from a comminuted silver-manganese ore using acidified thiourea. The graph shows that more than 90% of the manganese was extracted from the ore in 90 minutes using a 0.1M sulfuric acid solution.

FIG. 6 is a graph depicting the effect of particle size of the ore on the dissolution of silver from a comminuted silver-manganese ore using acidified thiourea. The graph shows that more than 90% of the silver was extracted from the ore in 60 minutes using a comminuted ore having particles in the range from those passing through a No. 60 sieve to those particles retained by a No. 150 sieve. The top two curves show this. The topmost curve shows that more than 90% of the silver was extracted from the ore in only 30 minutes when the particles were in the range from those passing through a No. 100 sieve to those particles retained by a No. 150 sieve.

FIG. 7 is a graph depicting the effect of particle size of the ore on the dissolution of manganese from a comminuted silver-manganese ore using acidified thiourea. The graph shows that more than 90% of the manganese was extracted from the ore in 60 minutes using a comminuted ore having particles in the range from those passing through a No. 60 sieve to those particles retained by a No. 150 sieve. The top two curves show this. The topmost curve shows that more than 90% of the manganese was extracted from the ore in only 30 minutes when the particles were in the range from those passing through a No. 100 sieve to those particles retained by a No. 150 sieve.

More generally, with respect to the particle size of the ore undergoing thiourea leaching, the preferred particle size depends upon the type of thiourea leaching that is contemplated. For example, when mined ore is subjected to heap or dump leaching, the particle size of the ore can be in the range from one sixteenth of an inch to several feet in diameter. Alternatively, when the ore is comminuted, the particle size of the ore should be suitable for agitation leaching such as particles that pass through a No. 20 Tyler sieve.

It is also contemplated that an ore containing silver and manganese can be mined in situ using the acidified thiourea leaching of the invention. In such a case, particle size of the ore is not a relevant consideration.

Figure 8:
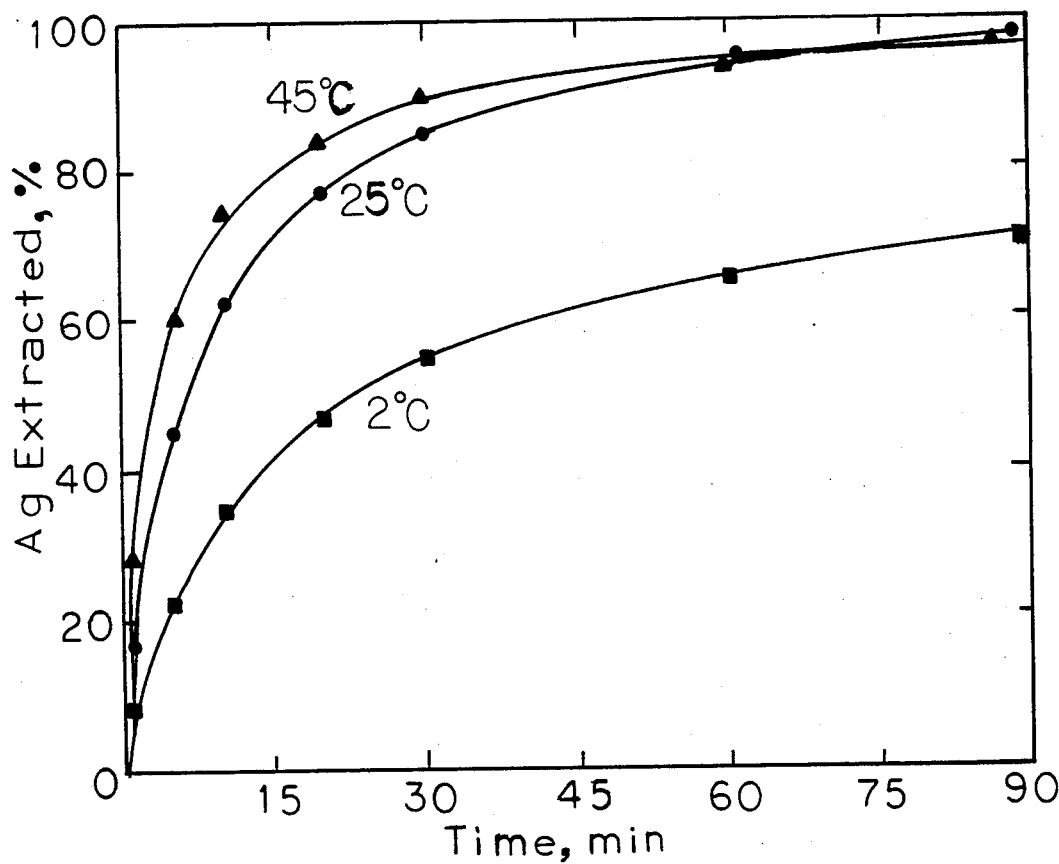
FIG. 8 is a graph depicting the effect of temperature on the dissolution of silver from a comminuted silver-manganese ore using acidified thiourea.

FIG. 8 is a graph depicting the effect of temperature on the dissolution of silver from a comminuted silver-manganese ore using acidified thiourea. The graph shows that more than 90% of the silver was extracted from the ore in 60 minutes using a temperature in the range from 25 deg. C to 45 deg. C. The top two curves show this. The topmost curve shows that approximately 90% of the silver was extracted from the ore in only 30 minutes when the temperature was 45 deg. C.

Figure 9:
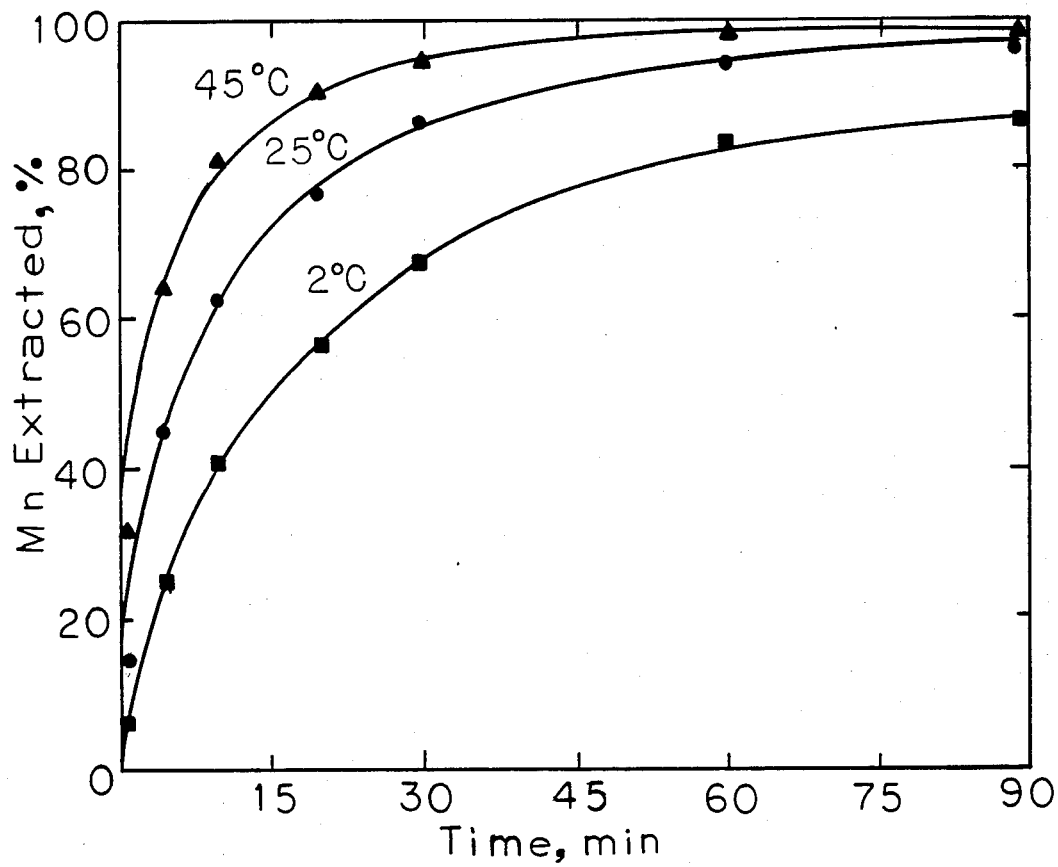
FIG. 9 is a graph depicting the effect of temperature on the dissolution of manganese from a comminuted silver-manganese ore using acidified thiourea.

FIG. 9 is a graph depicting the effect of temperature on the dissolution of manganese from a comminuted silver-manganese ore using acidified thiourea. The graph shows that more than 90% of the manganese was extracted from the ore in 60 minutes using a temperature in the range from 25 deg. C to 45 deg. C. The top two curves show this. The topmost curve shows that more than 90% of the manganese was extracted from the ore in only 30 minutes when the temperature was 45 deg. C.

Additional tests have been conducted to demonstrate the effectiveness of an acidified thiourea solution in the dissolution of higher oxides of manganese. Five grams of insoluble manganese dioxide were treated with 0.1M acidic thiourea solution resulting in complete dissolution of the manganese dioxide in ten minutes, and the consumption of thiourea was stoichiometric.

Further tests were conducted to demonstrate the effectiveness of using a relatively inexpensive augmenting reducing agent to augment the reducing properties of more expensive thiourea during a thiourea leach. More specifically, an acidified thiourea leach solution containing 10% sulfur dioxide by volume was compared with an acidified thiourea solution not containing sulfur dioxide with respect to effective leaching of a magnanese-silver ore. It was observed that consumption of the thiourea was reduced by 30% with the leachant solution containing the sulfur dioxide as an augmenting reductant.

Although a theoretical explanation of the mechanism for the reactions between the ore and the acidified thiourea leachant is not necessary for effective utilization of the method of the invention, a theoretical explanation may be beneficial and is provided herein. Manganese in the ore minerals is present in its higher oxidation states which are insoluble in water. Silver can be present in the ore either as free metallic silver or as a silver compound.

The present leaching method is effective for both kinds of silver ore. Thiourea serves as a reducing agent for insoluble higher oxides of manganese and reduces the higher oxides to a lower oxidation state which is water soluble. As thiourea reduces the manganese, the thiourea is oxidized into an oxidized form (most likely formamidine disulfide). The oxidized form of thiourea will dissolve free silver. In addition, thiourea itself will dissolve the silver present in the compound form.

Numerous benefits result from employing the principles of the invention. With the invention a wide range of thiourea concentrations can be used with a wide range of acid concentrations to obtain high yields of silver and manganese in short periods of time, from 60 to 90 minutes. Also, a wide range of temperatures can be used as well as a wide range of ore particle sizes. Both the silver and the manganese are leached from the ore simultaneously with one leaching step.

With the invention, no hazardous cyanide materials are used. Thiourea itself is nontoxic, and it breaks down over time into nontoxic breakdown products, e.g. cyanamide and elemental sulfur.

By using the methods of the invention, mineral deposits containing both silver and manganese can be exploited efficiently to obtain high silver and manganese yields.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

In one modification, in accordance with the principles of the invention, thiourea derivatives, instead of or in conjunction with generic thiourea, can be employed.

Although many thiourea derivatives are, at the present time, relatively expensive and not available in large quantities, it is contemplated that such thiourea derivatives could be used with the invention if such derivatives became less expensive and more readily available in the future.

In addition, with respect to thiourea derivatives, it is known that some thiourea derivatives are more toxic than generic thiourea. In contemplating the use of such derivatives, their toxicity would be an important consideration.

The important characteristic of the thiourea derivatives, with respect to their utilization in accordance with the invention, is that they dissolve both manganese and silver in a ore in an acidified solution.

Thiourea derivatives that are contemplated include: N-methylthiourea, N-ethylthiourea, N-isopropylthiourea, N-(n-butyl)-thiourea, N-phenylthiourea, N-benzylthiourea, N-naphthylthiourea, N-tolylthiourea, N-(o-chlorophenyl)-thiourea, N-(p-hydroxyphenyl)-thiourea, N-(p-ethoxyphenyl)-thiourea, N-(2,4-dimethylphenyl)-thiourea, N-acetylthiourea, N-benzoylthiourea, N,N-dimethylthiourea, N,N-diethylthiourea, N,N-dipropylthiourea, s-dimethylthiourea, s-diisopropylthiourea, s-di-n-butylthiourea, s-diphenylthiourea, s-ditolylthiourea, N,N-phenyltolythiourea, N,N,N'-trimethylthiourea, N,N,N'-triethylthiourea, and N,N,N'-tripropylthiourea among others.

The particular acid that is used for acidifying the thiourea is not critical. For example, hydrochloric acid and nitric acid can also be used.

As stated above, the ore that is used can be selected from the group consisting of in situ ore, mined ore, comminuted ore, and ore concentrate. It is understood that a given ore sample can have more than one group characteristic. For example, a mined ore can be comminuted, or an ore concentrate can be obtained from a comminuted ore sample.

What is claimed is:

1. A method for extracting manganese oxides from an ore, said method comprising the step of leaching the ore with an acidic thiourea solution to directly reduce the manganese oxides and to oxidize the thiourea to form a leach liquor containing compounds of manganese, wherein the ore is selected from the group consisting of in situ ore, mined ore, comminuted ore, and ore concentrate.

2. A method for extracting silver and manganese from an ore containing manganese oxides, said method comprising the step of leaching the ore with an acidic thiourea solution to simultaneously reduce the manganese oxides and complex the silver form a leach liquor containing compounds of silver and manganese, wherein the ore is selected from the group consisting of in situ ore, mined ore, comminuted ore, and ore concentrate.

3. The extraction method described in claim 2 wherein the thiourea is present in a concentration ranging from 0.0001 to 1.0 molar.

4. The extraction method described in claim 2 wherein the thiourea is present in a concentration ranging from 0.01 to 0.1 molar.

5. The extraction method described in claim 2 wherein the thiourea is acidified by hydrogen ion present in a concentration ranging from 0.0001 to 0.5 molar.

6. The extraction method described in claim 2 wherein the thiourea is acidified by sulfuric acid present in a concentration ranging from 0.00005 to 0.5 molar.

7. The extraction method described in claim 2 wherein the leaching temperature is in the range from 0–45 degrees Centigrade.

8. The extraction method described in claim 2 wherein the leaching temperature is in the range from 20–30 degrees Centigrade.

9. The extraction method described in claim 2 wherein comminuted ore is present in a particle size suitable for agitation leaching.

10. The extraction method described in claim 9 wherein the particles of the comminuted ore pass through a No. 20 Tyler sieve.

11. The extraction method described in claim 2 wherein the mined ore is present in a particle size suitable for heap or dump leaching.

12. The extraction method described in claim 11 wherein the particles of the mined ore are in the range of from one sixteenth of an inch to several feet in diameter.

13. A method for extracting silver and manganese from an ore, said method comprising the steps of:
 leaching the ore with an acidic thiourea solution to form a leach liquor containing compounds of silver and manganese, wherein the ore is selected from the group consisting of in situ ore, mined ore, comminuted ore, and ore concentrate; and
 contacting the leach liquor with a quantity of carbon to adsorb the silver compounds on the carbon and to form an extract solution containing manganese compounds,
 treating the extract solution which contains manganese compounds to recover manganese metal, and
 treating the carbon which contains adsorbed silver compounds to recover silver metal.

14. The method described in claim 13 wherein the ore is mined ore placed on a heap and subjected to heap leaching.

15. The method described in claim 13 wherein the ore is mined ore placed on a dump and subjected to dump leaching.

16. The method described in claim 13, further comprising the step of treating the extract solution which contains manganese compounds to recover manganese metal.

17. The method described in claim 13, further comprising the step of treating the carbon which contains adsorbed silver compounds to recover silver metal.

18. The method described in claim 13 wherein the carbon is activated carbon.

19. The method described in claim 13, further comprising the steps of:
 treating the carbon which contains adsorbed silver compounds to recover silver metal; and
 treating the extract solution which contains manganese compounds to recover manganese metal.

20. A method for extracting silver and manganese in situ from an ore deposit, said method comprising the steps of:
 drilling a hole into the ore deposit;
 pumping an acidified thiourea leachant solution into the hole;
 leaching the silver and manganese in the form of silver and manganese compounds into the acidified thiourea solution;
 pumping the leachant solution out of the hole; and
 contacting the leachant solution with a quantity of carbon to adsorb the silver compounds on the carbon and to form an extract solution containing manganese compounds.

21. A method for extraction of manganese from a manganese ore, said method comprising the steps of:
 mining the ore;
 comminuting the ore;
 concentrating the manganese minerals into a concentrate;
 leaching the ore with a acidified thiourea leachant solution to produce a leach liquor containing manganese compounds, and
 recovering the manganese from the leach liquor.

22. A method for extraction of manganese from a manganese ore, said method comprising the steps of:
leaching the ore with an augmenting reducing agent to reduce higher oxides of manganese, wherein the ore is selected from the group consisting of in situ ore, mined ore, comminuted ore, and ore concentrate;
leaching the ore with an acidic thiourea solution to form a leach liquor containing compounds of manganese, wherein said augmenting reducing agent leaching step and said acidic thiourea leaching step are performed simultaneously; and
treating the extract solution which contains manganese compounds to recover manganese metal.

23. The method described in claim 22 wherein an augmenting reducing agent is sulfur dioxide.

24. The method described in claim 22 wherein an augmenting reducing agent is selected from the group consisting of sulfur dioxide, coal, and sugars.

25. The method described in claim 22 wherein said augmenting reducing agent leaching step and said acidic thiourea leaching step are performed simultaneously.

26. A method for separating silver thiourea complexes from carbon comprising the step of eluting the complexes from the carbon with an aqueous thiosulfate solution.

27. A method for extracting silver and manganese from an ore containing higher oxides of manganese and free silver, said method comprising the step of leaching the ore with an acidic thiourea solution to form a leach liquor containing reduced manganese compounds, oxidized thiourea, and silver complexed by reacting with said oxidized thiourea, wherein the ore is selected from the group consisting of in situ ore, mined ore, comminuted ore, and ore concentrate.

28. A method for extracting manganese from an ore, said method comprising the step of leaching the ore with an acidic thiourea solution to form a leach liquor containing compounds of manganese, wherein the ore is selected from the group consisting of in situ ore, mined ore, comminuted ore, and ore concentrate, wherein the thiourea is present in a concentration ranging from 0.0001 to 1.0 molar, wherein the thiourea is acidified by hydrogen ion present in a concentraton ranging from 0.0001 to 0.5 molar, and wherein the leaching temperature is in the range from 0–45 degrees Centigrade.

29. A method for extracting manganese from an ore, said method comprising the step of leaching the ore with a solution consisting essentially of an acidic thiourea solution to form a leach liquor containing compounds of manganese, wherein the ore is selected from the group consisting of in situ ore, mined ore, comminuted ore, and ore concentrate.

30. A method for extracting silver and manganese from an ore, said method comprising the step of leaching the ore with a solution consisting essentially of an acidic thiourea solution to form a leach liquor containing compounds of silver and manganese, wherein the ore is selected from the group consisting of in situ ore, mined ore, comminuted ore, and ore concentrate.

31. A method for extracting silver and manganese from an ore, said method comprising the steps of:
leaching the ore with a solution consisting essentially of an acidic thiourea solution to form a leach liquor containing compounds of silver and manganese, wherein the ore is selected from the group consisting of in situ ore, mined ore, comminuted ore, and ore concentrate; and
contacting the leach liquor with a quantity of carbon to adsorb the silver compounds on the carbon and to form an extract solution containing manganese compounds.

32. A method for extraction of manganese from a manganese ore, said method comprising the steps of:
leaching the ore with an augmenting reducing agent to reduce higher oxides of manganese, wherein the ore is selected from the group consisting of in situ ore, mined ore, comminuted ore, and ore concentrate;
leaching the ore with a solution consisting essentially of an acidic thiourea solution to form a leach liquor containing compounds of manganese; and
treating the extract solution which contains manganese compounds to recover manganese metal.

33. A method for extracting silver and manganese from an ore containing higher oxides of manganese and free silver, said method comprising the step of leaching the ore with a solution consisting essentially of an acidic thiourea solution to form a leach liquor containing reduced manganese compounds, oxidized thiourea, and silver complexed by reacting with said oxidized thiourea, wherein the ore is selected from the group consisting of in situ ore, mined ore, comminuted ore, and ore concentrate.

* * * * *